(12) United States Patent
Orubor

(10) Patent No.: US 9,220,191 B2
(45) Date of Patent: Dec. 29, 2015

(54) YARD AND GARDEN CHEMICAL DISPENSER

(76) Inventor: Lawrence Orubor, Calgary (CA)

( * ) Notice: Subject to any disclaimer, the term of this patent is extended or adjusted under 35 U.S.C. 154(b) by 0 days.

(21) Appl. No.: 13/172,927

(22) Filed: Jun. 30, 2011

(65) Prior Publication Data

US 2012/0223158 A1    Sep. 6, 2012

Related U.S. Application Data

(60) Provisional application No. 61/361,938, filed on Jul. 7, 2010.

(51) Int. Cl.
| | | |
|---|---|---|
| *B05B 7/24* | (2006.01) | |
| *A01C 23/04* | (2006.01) | |
| *B05B 1/16* | (2006.01) | |
| *B05B 7/04* | (2006.01) | |

(52) U.S. Cl.
CPC ............. *A01C 23/042* (2013.01); *B05B 1/1627* (2013.01); *B05B 7/0408* (2013.01); *B05B 7/2445* (2013.01); *B05B 7/2472* (2013.01)

(58) Field of Classification Search
CPC ...... A01C 23/042; B05B 1/16; B05B 1/1627; B05B 7/04; B05B 7/0408; B05B 7/244; B05B 7/2443; B05B 7/2445; B05B 7/2472
USPC .................. 239/310–318, 443, 444, 446, 447
See application file for complete search history.

(56) References Cited

U.S. PATENT DOCUMENTS

| | | | |
|---|---|---|---|
| 5,100,060 A | 3/1992 | Haferkorn | |
| 5,119,992 A | 6/1992 | Grime | |
| 5,213,265 A | 5/1993 | Englhard et al. | |
| 5,695,125 A | 12/1997 | Kumar | |
| 6,314,979 B1 * | 11/2001 | Lips ................................ 137/3 |
| 6,345,773 B1 | 2/2002 | Shanklin et al. | |
| 2007/0138320 A1 | 6/2007 | Timmes et al. | |

* cited by examiner

*Primary Examiner* — Christopher Kim
(74) *Attorney, Agent, or Firm* — Maxey Law Offices, PLLC; Stephen Lewellyn

(57) ABSTRACT

A chemical dispensing apparatus includes a housing that is connectable to a source of water, such as a standard garden hose and a chemical dispenser configured to mix a chemical concentrate with the source of water as it flows through the housing and dispensed from the housing from either a sprinkler head or a misting nozzle. Various configurations of fluid passages and water flow are disclosed.

18 Claims, 14 Drawing Sheets

YARD AND GARDEN CHEMICAL DISPENSER

CROSS-REFERENCE TO RELATED APPLICATIONS

This application claims the benefit of U.S. Provisional Application No. 61/361,938, filed Jul. 7, 2010, the entire of which is incorporated herein by reference.

FIELD OF THE INVENTION

The present invention relates generally to a yard or garden accessory enabling the automatic addition of a lawn treatment material, such as fertilizer, herbicide or insecticide, to the water being sprinkled on yard or garden.

BACKGROUND OF THE INVENTION

The proper treatment and care of yards and gardens is highly desirable to prevent destruction from insects and deterioration from malnutrition. The mixture and application of treatment solutions, however, is a time consuming procedure that requires close attention to chemical-water ratios and their distribution. Since proper care equates to scheduled maintenance, many lawns and gardens become neglected, resulting in unnecessary refurbishing costs. Moreover, lawns, gardens, and vegetation still fall victim to improper maintenance, despite consistent care when poorly balanced solutions are administered.

SUMMARY OF THE INVENTION

The yard and garden chemical dispenser of this invention provides an apparatus for incorporation into a water supply system a way to deliver lawn treatment chemicals such as fertilizer, herbicide or insecticide to lawns, yards and other botanical and life systems by the controlled application of the chemicals in amounts and periods.

In general, in one aspect, a chemical dispensing apparatus for use in delivery of a treatment solution to a lawn is provided. The apparatus includes a main fluid supply passage configured for connection to a pipe system carrying water under pressure. A housing has first and second discharge ports. A fluid discharge passage and a discharge control valve connecting the fluid discharge passage to the first discharge port and the second discharge port. The discharge control valve operates to selectively permit the flow of fluid or preclude the flow of fluid from the fluid discharge passage to either the first discharge port or the second discharge port. An internal fluid supply passage connects the main fluid supply and the fluid discharge passage. A supply control valve connects the internal fluid supply passage and the main fluid supply passage. The supply control valve operates to selectively permit the flow of fluid or preclude the flow of fluid from the main supply passage to the internal fluid supply passage. A liquid chemical dispenser is configured to dispense a chemical into a flow of fluid through the internal fluid supply passage.

In general, in another aspect, the liquid chemical dispenser includes an accumulator for containing a liquid chemical and a lift tube connecting the accumulator and the internal fluid supply passage such that a flow of fluid through the internal fluid supply passage results in a quantity of liquid chemical contained in the accumulator being drawn through the lift tube and into the flow of fluid through the internal fluid supply passage.

In general, in another aspect, the apparatus includes a bypass passage connecting the main fluid supply passage to the fluid discharge passage. A flap valve operates to connect the fluid discharge passage and the internal fluid supply passage and to seal the bypass passage from the discharge passage when a fluid flows through the internal fluid supply passage or to connect the bypass passage to the fluid discharge passage and to seal the internal fluid supply passage from the bypass passage when a fluid flow through the bypass passage. The supply control valve further connects the bypass passage and the main fluid supply passage, and further operates to selectively permit the flow of fluid or preclude the flow of fluid from the main supply passage to either of the internal fluid supply passage and the bypass passage.

In general, in another aspect, the apparatus includes a fluid pump disposed across the lift tube and operating to pump a quantity of liquid chemical from the accumulator and into the internal fluid supply passage.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The accompanying drawings, which are included to provide further understanding of the invention and are incorporated in and constitute a part of this specification, illustrate preferred embodiments of the invention and together with the description serve to explain the principles of the invention, in which.

DETAILED DESCRIPTION OF THE INVENTION

Figure 1:
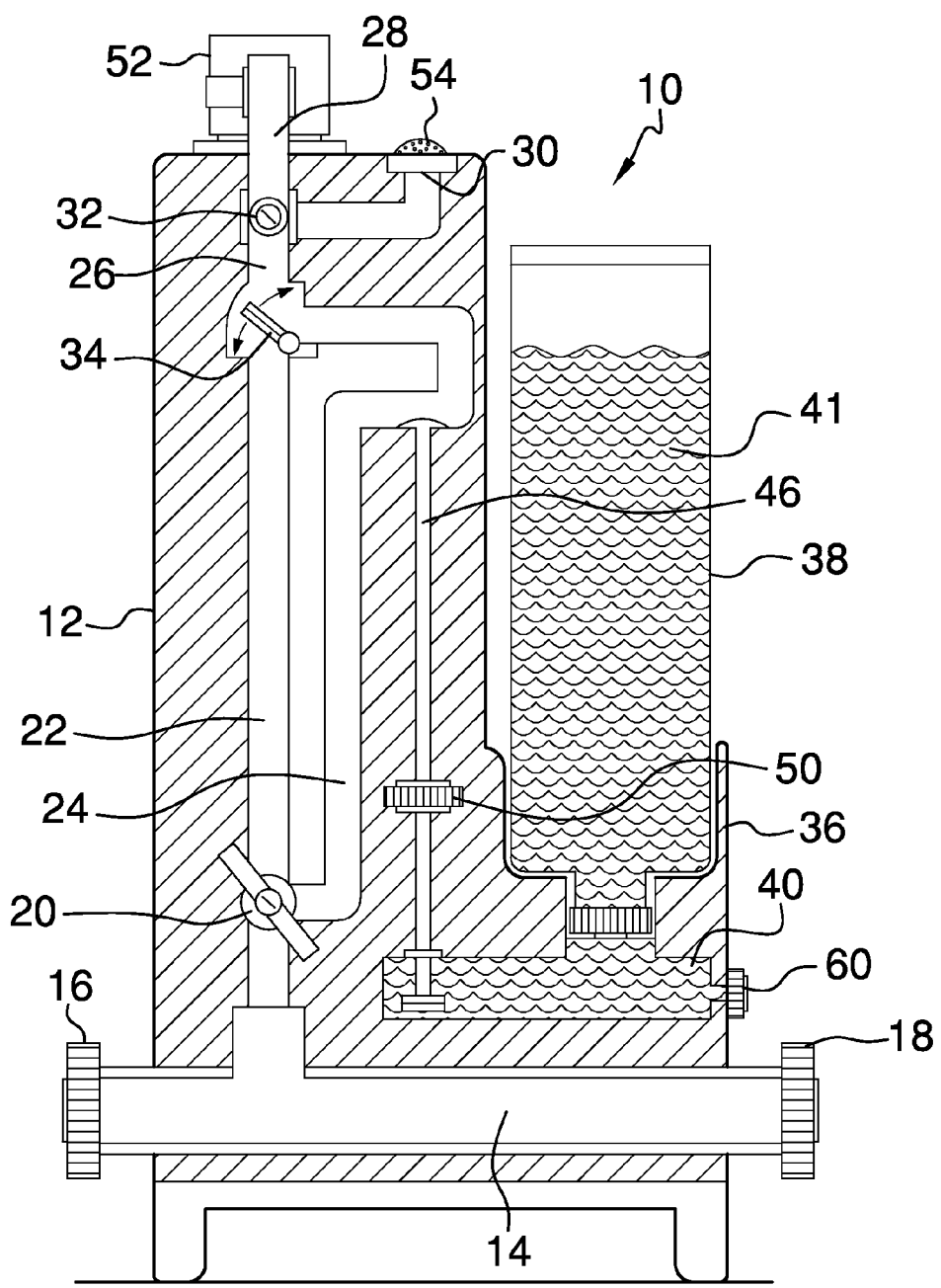
FIG. 1 is a diagrammatic illustration of a specially designed lawn and garden chemical dispenser in accordance with the principals of the invention.
Figure 2:
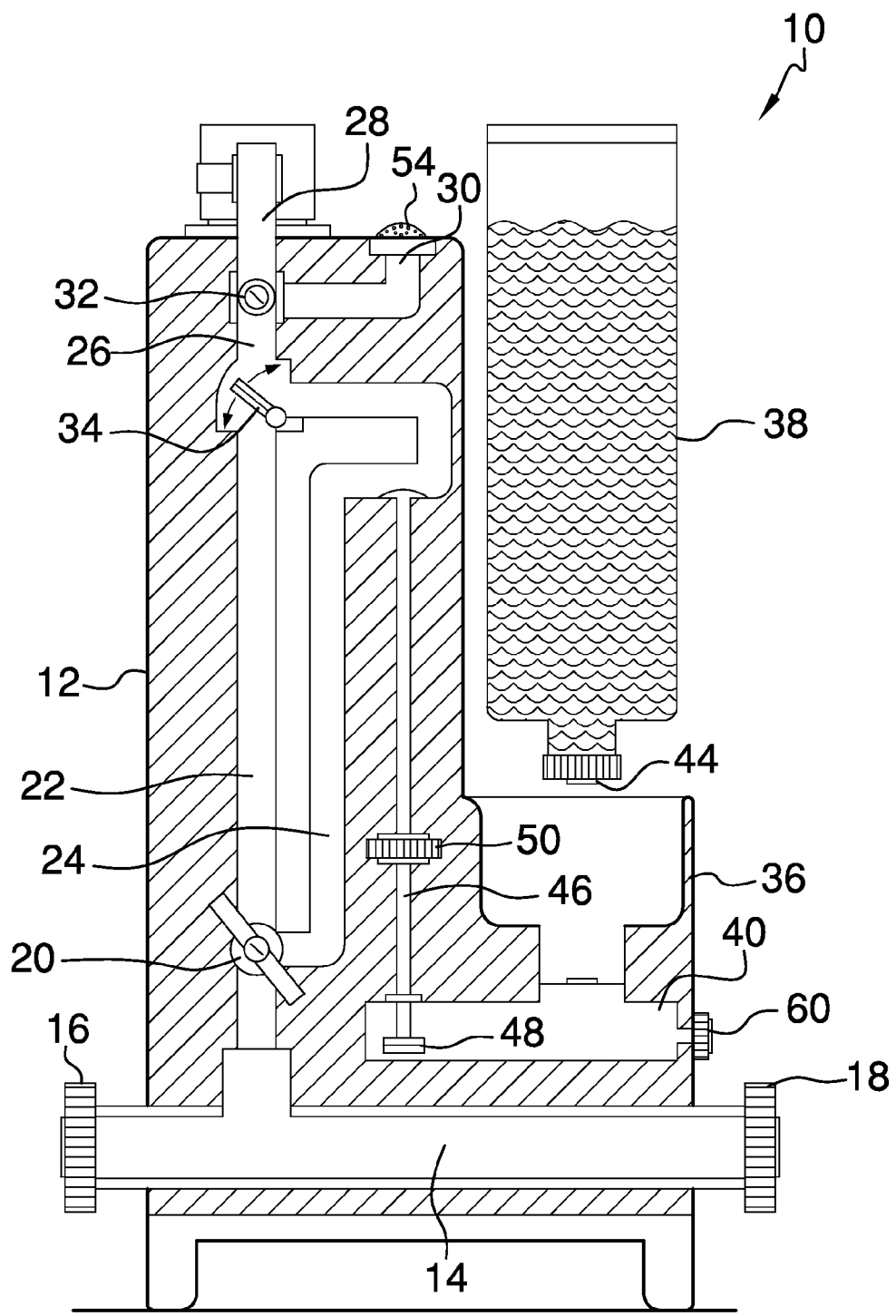
FIG. 2 is a diagrammatic illustration of the dispenser of FIG. 1 showing a container removed.

Diagrammatically illustrated in FIGS. 1 and 2 is a specially design lawn and garden chemical dispenser 10 particularly useful in dispensing chemicals for treating a lawn or garden. Such chemicals may include, among others, herbicides, fertilizers, pesticides, insecticides and/or fragrances. In FIG. 1, the dispenser 10 is shown assembled, and in FIG. 2, the dispenser is shown partially disassembled. The dispenser 10 includes a housing 12 having a several of fluid flow conduits or passages that can be integral with the housing or separate tubes extending the housing. Of these passages is included a main fluid passage 14 that extends generally laterally through housing 12 about the bottom thereof, and is fitted with hose couplings 16 and 18 at opposite ends thereof. Hose couplings 16, 18 permit the connection of hoses to the dispenser 10 to provide a source of pressurized water and to further permit the interconnection of the dispenser to additional dispenser devices.

Still referring to FIGS. 1 and 2, a three-way valve 20 fluidically connects the main fluid passage 14 to a by-pass passage 22 and a supply passage 24. The by-pass passage 22 extends from valve 20 at one end and is fluidically connected at the opposite end to a discharge passage 26. Likewise, the supply passage 24 extends from valve 20 at one end and is fluidically connected at the opposite end to discharge passage 26. Discharge passage 26 is selectively fluidically connected to a first discharge port 28 and a second discharge port 30 by two-way valve 32. Discharge port 28 can be fitted with a sprinkler head 52. Discharge port 30 can be fitted with a mister 54. A flap valve 34 extends the discharge passage 26 and selectively seals the supply passage 24 or the by-passage 22 from the discharge passage as fluid/water flows through the opposite passage.

As further shown in FIGS. 1 and 2, the dispenser further includes a mount or cradle 36 disposed on housing 12 for removably receiving and retaining therein a container 38 of liquid chemical concentrate solution 41. The container 38 is shown received and retained by the cradle 36 in FIG. 1, and is shown removed from the cradle in FIG. 2. When container 38 is received and retained by the cradle, as shown in FIG. 1, the container is engaged with the dispenser 10, such that the chemical concentrate solution 41 held within the container is free to flow into a fluid accumulator 40. The engagement structure between the container 38 and the dispenser 10 needs to serve several functions, including retaining the container 38 within the cradle, and fluidically connecting the container to the fluid accumulator 40 to receive a free flow of the chemical concentrate solution 41 from the container. There are numerous possible engagement structures that can provide these functions. In one possible, and not limiting example, the structure could include a membrane piercing valve 42 that penetrates through a membrane seal 44 on the container 38. Of course, other suitable structures are possible.

Maintaining reference to FIGS. 1 and 2, the fluid accumulator 40 is fluidically connected to the supply passage 24 by a delivery tube 46, such as a siphon tube. A screen filter 48 may be fitted at the end of the tube 46 to prevent debris within the fluid accumulator 40 from flowing into the tube. Additionally, a flow regulating valve 50 can be placed across tube 46 to regulate the flow of fluid through the tube, and thus the amount of chemical solution 38 being drawn through the tube. Accumulator 40 include a drain port 60 for draining concentrate solution therewithin.

Figure 3:
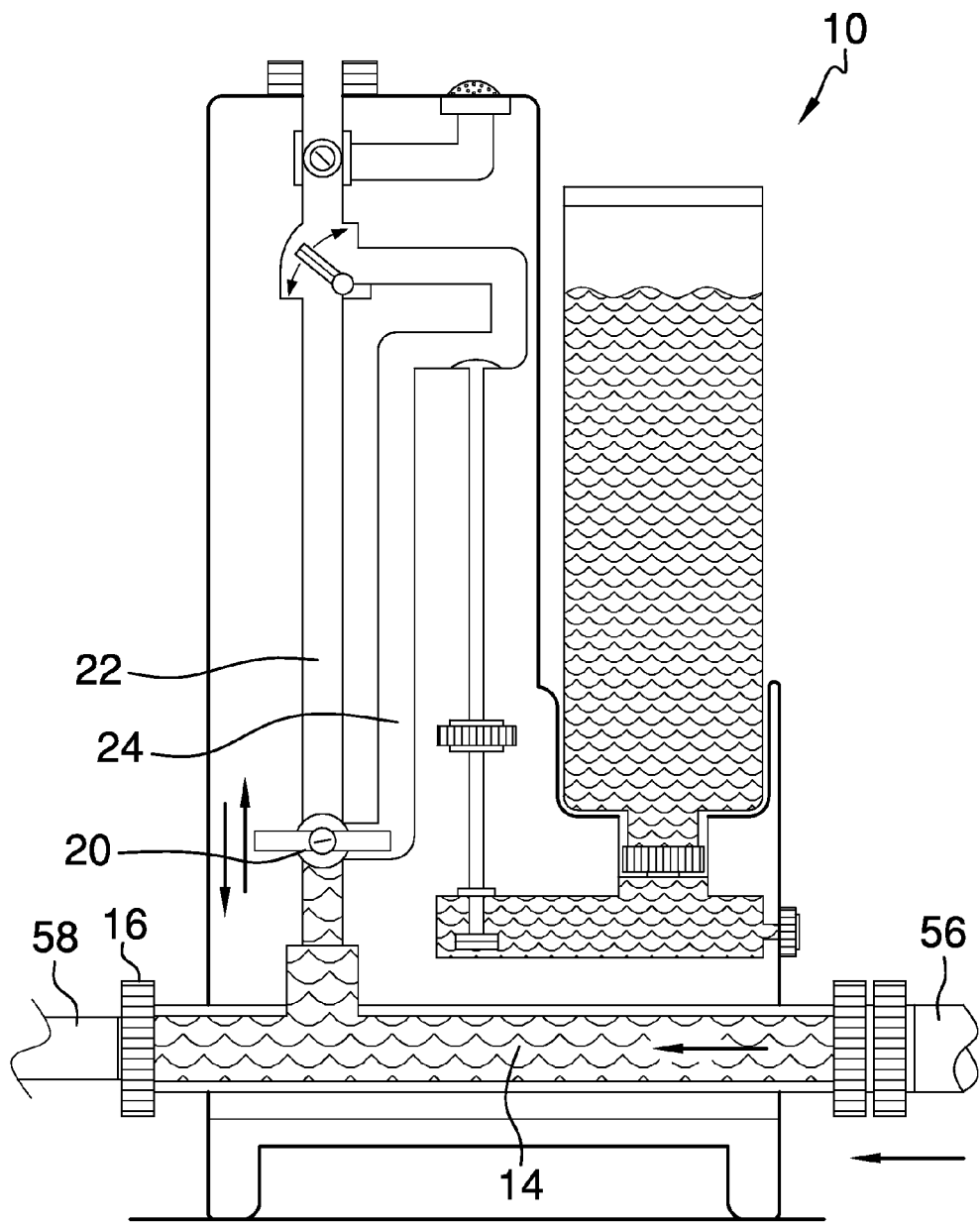
FIG. 3 is diagrammatic illustration the dispenser in a first mode of operation where the dispenser is by-passed.

In FIG. 3, there is diagrammatically illustrated the dispenser 10 in a first mode of operation where the dispenser is by-passed. Here a supply hose 56 carrying a supply of pressurized water is connected to hose coupling 18, a second hose 58 is connected to hose coupling 16. Valve 20 is positioned in a first position where water is only permitted to flow through the main supply passage 14 and not permitted to flow from the main supply passage into either of passages 22 or 24. Accordingly, water from supply hose 56 flows through passage 14 into hose 58 bypassing the dispenser 10.

Figure 4:
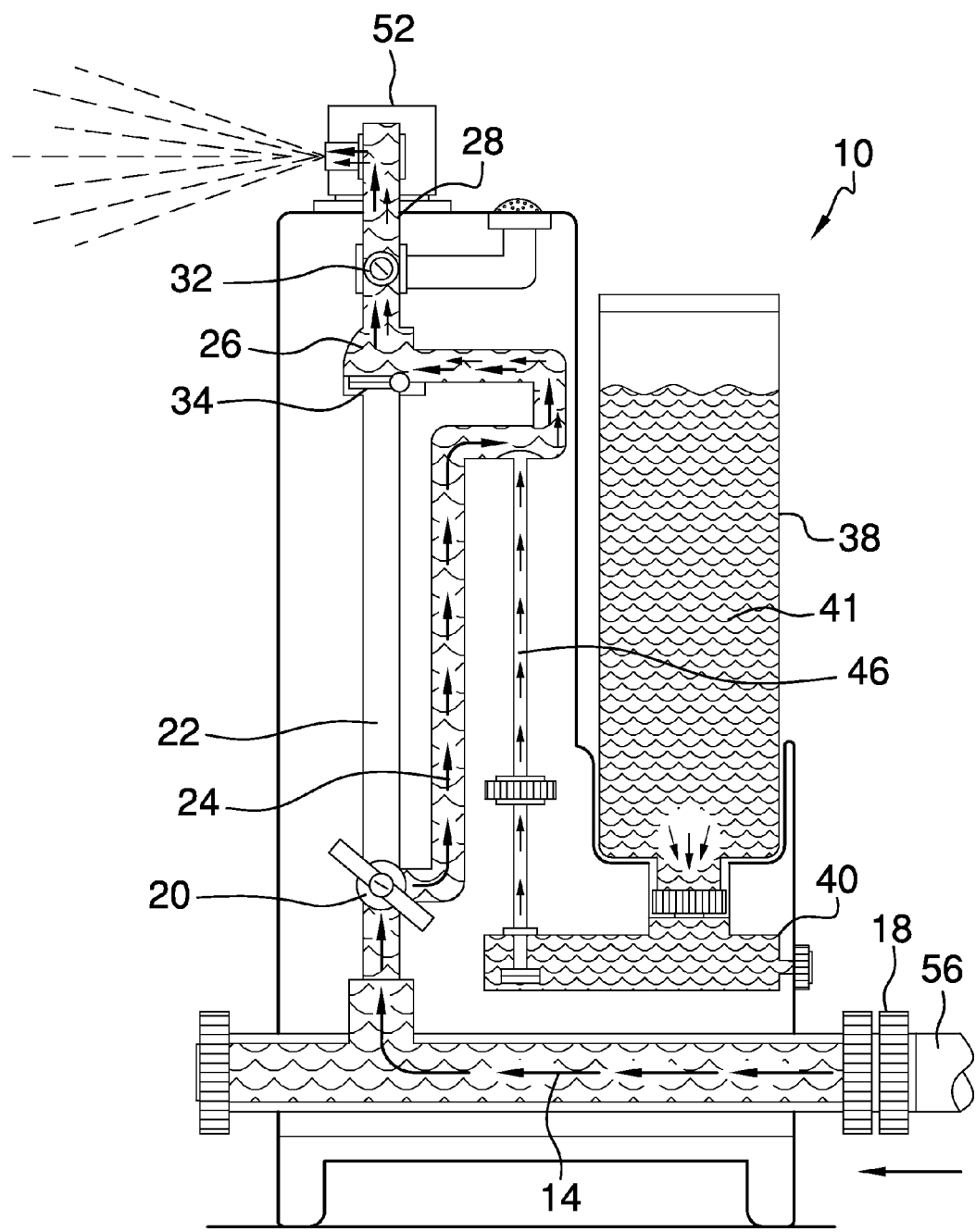
FIG. 4 is a diagrammatic illustration of the dispenser in a second mode of operation where the dispenser is operating to dispense a chemical solution through a spray head.
Figure 5:
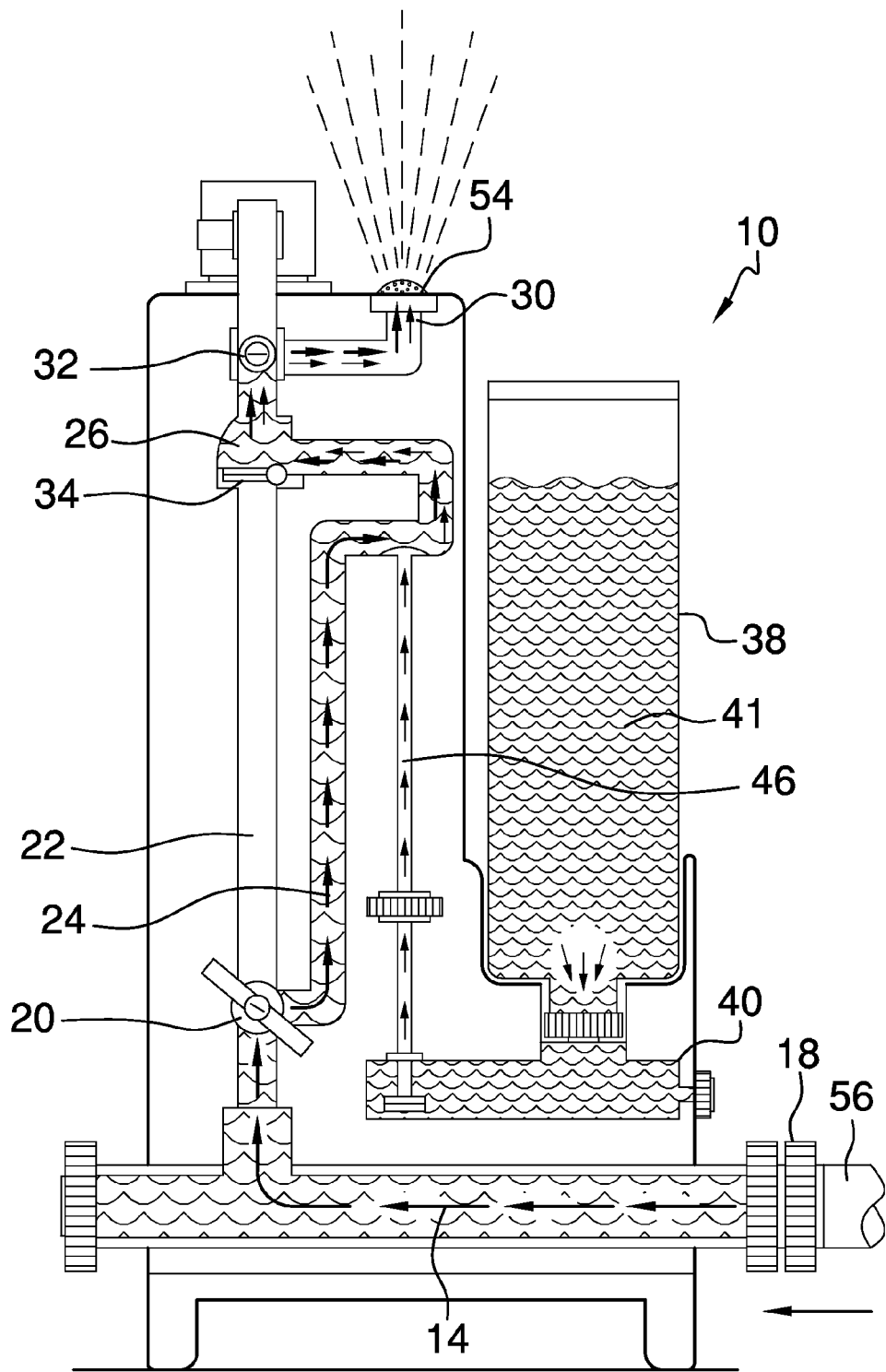
FIG. 5 is a diagrammatic illustration of the dispenser in a second mode of operation where the dispenser is operating to dispense a chemical solution through a mister.

In FIG. 4, there is diagrammatically illustrated the dispenser 10 in a second mode of operation wherein the dispenser is operating to dispensing a chemical solution comprising water admixed with the concentrate solution 41 contained within container 38. Here a supply hose 56 carrying a supply of pressurized water is connected to hose coupling 18, thereby providing a flow of pressurized water in the main supply passage 14. Valve 20 is positioned in a second position, where the flow of pressurized water flows through valve 20 and into passage 24. As water flows through passage 24 it flows across the siphon tube 46 causing concentrate solution 41 within accumulator 40 to be drawing up the siphon tube and where it is admix with the water flowing through passage 24. The water admixed with the concentrate solution then flows into the discharge passage 26 causing valve 34 to seal passage 22, and then through discharge port 28 and out of sprinkler or spray head 52, as shown. Valve 32 can be operated to direct the flow through discharge port 30 and out of mister 54, as shown in FIG. 5.

Figure 6:
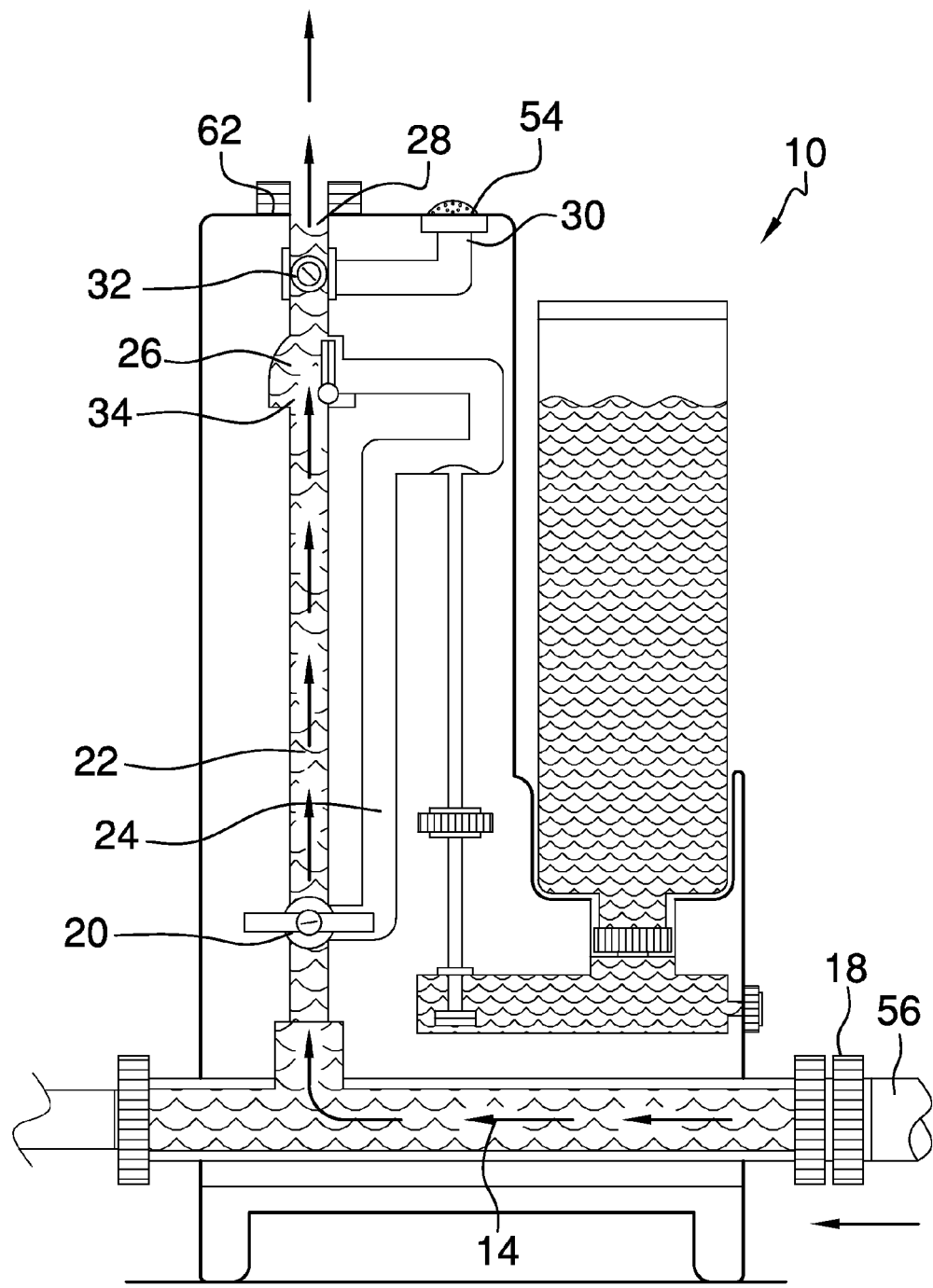
FIG. 6 is a diagrammatic illustration of the dispenser in a third mode of operation, where the dispenser is operating to dispense fresh water.

In FIG. 6, there is diagrammatically illustrated the dispenser 10 in a third mode of operation where the dispenser is operating to dispense fresh water. Here a supply hose 56 carrying a supply of pressurized water is connected to hose coupling 18, thereby providing a flow of pressurized water in the main supply passage 14. Valve 20 is positioned in a third position, where the flow of pressurized water flows through valve 20 and into passage 22, operating valve 34 sealing passage 24, and discharged through discharge port 28. Valve 32 can be operated to direct the flow of water through discharge port 30 and out of mister 54, as similarly shown in FIG. 5. Further shown in FIG. 6, is the sprinkler or spray head 52 removed to illustrate a possible threaded connection 62 to permit attachment of the spray head to the dispenser 10 in fluidic communication with discharge port 28. It is to be understand spray head 52 may take on various forms of sprinkler heads or spray heads, and is not limited in any way to any single variation.

Figure 7:
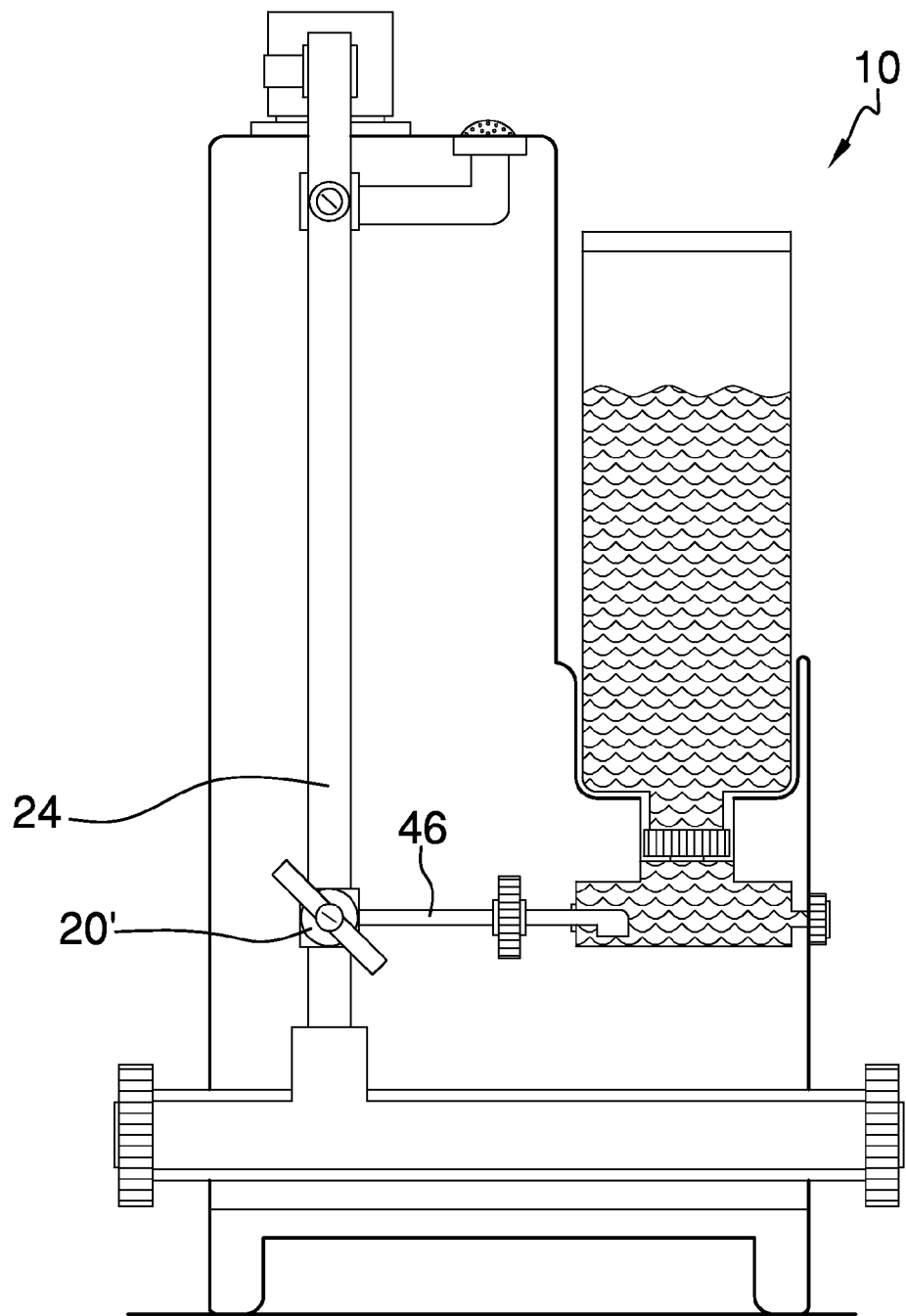
FIG. 7 is a diagrammatic illustration of an alternative construction of the dispenser where a by-pass passage is eliminated.

In FIG. 7, there is diagrammatically illustrated an alternative construction of the dispenser 10. Here, by-pass passage 22 is eliminated and three-way valve 20 is replaced with a two-way valve 20'. Delivery or siphon tube 46 can be placed in fluidic communication with passage 24 through valve 20', as shown. Alternatively, siphon tube 46 can be connected to passage 24 downstream of valve 20'.

Figure 8:
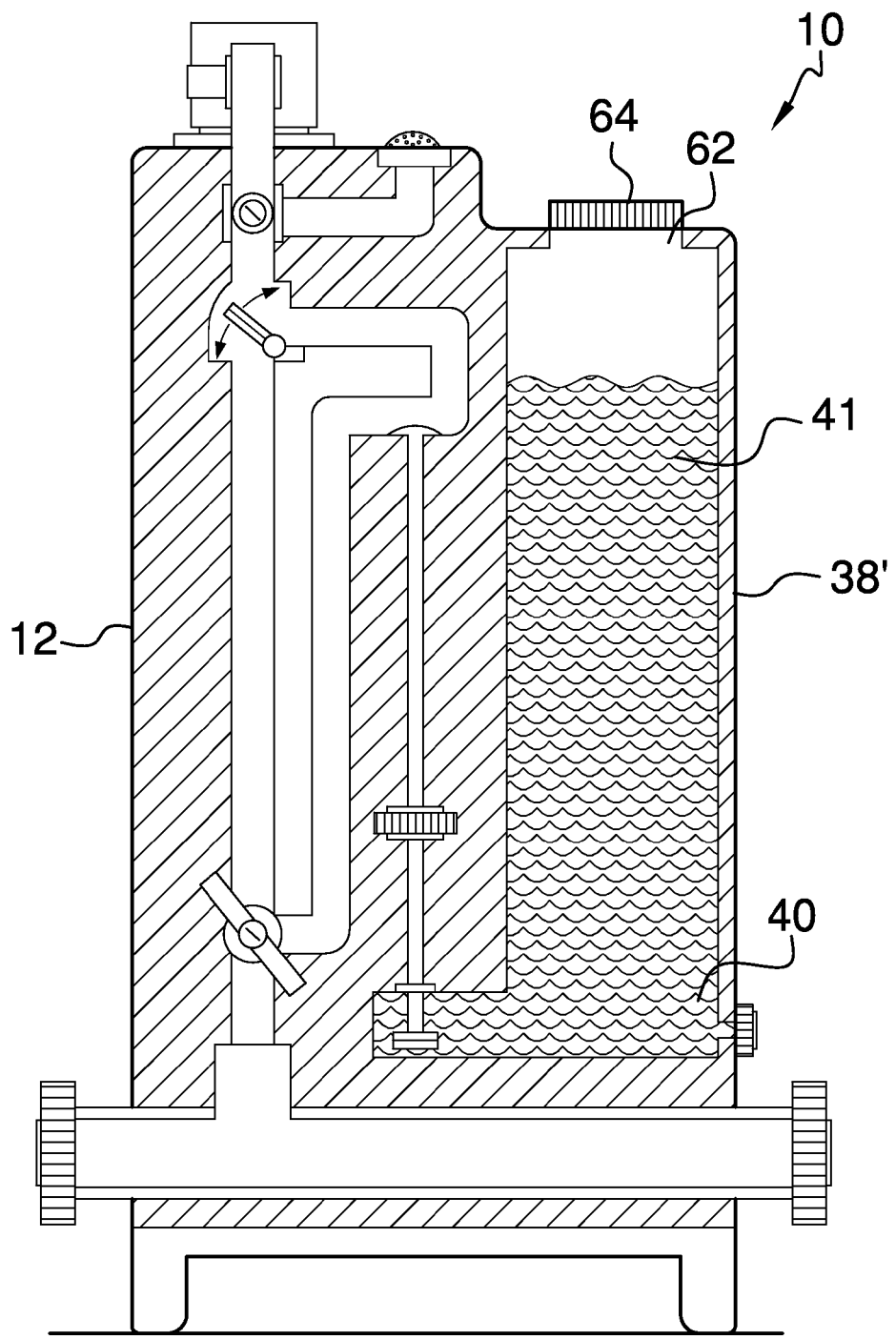
FIG. 8 is a diagrammatic illustration of an alternative construction of the dispenser including an integrated container.

In FIG. 8, there is diagrammatically illustrated an alternative construction of the dispenser 10. Here, the dispenser 10 includes a fixed or integrated container 38' that is not removable from the housing 12. Container 38' and the accumulator 40 can be integrated, as shown. Container 38' includes a mouth or opening 62 having a removable cover 64 permitting filing of the container 38' with a concentrate solution 41.

Figure 9:
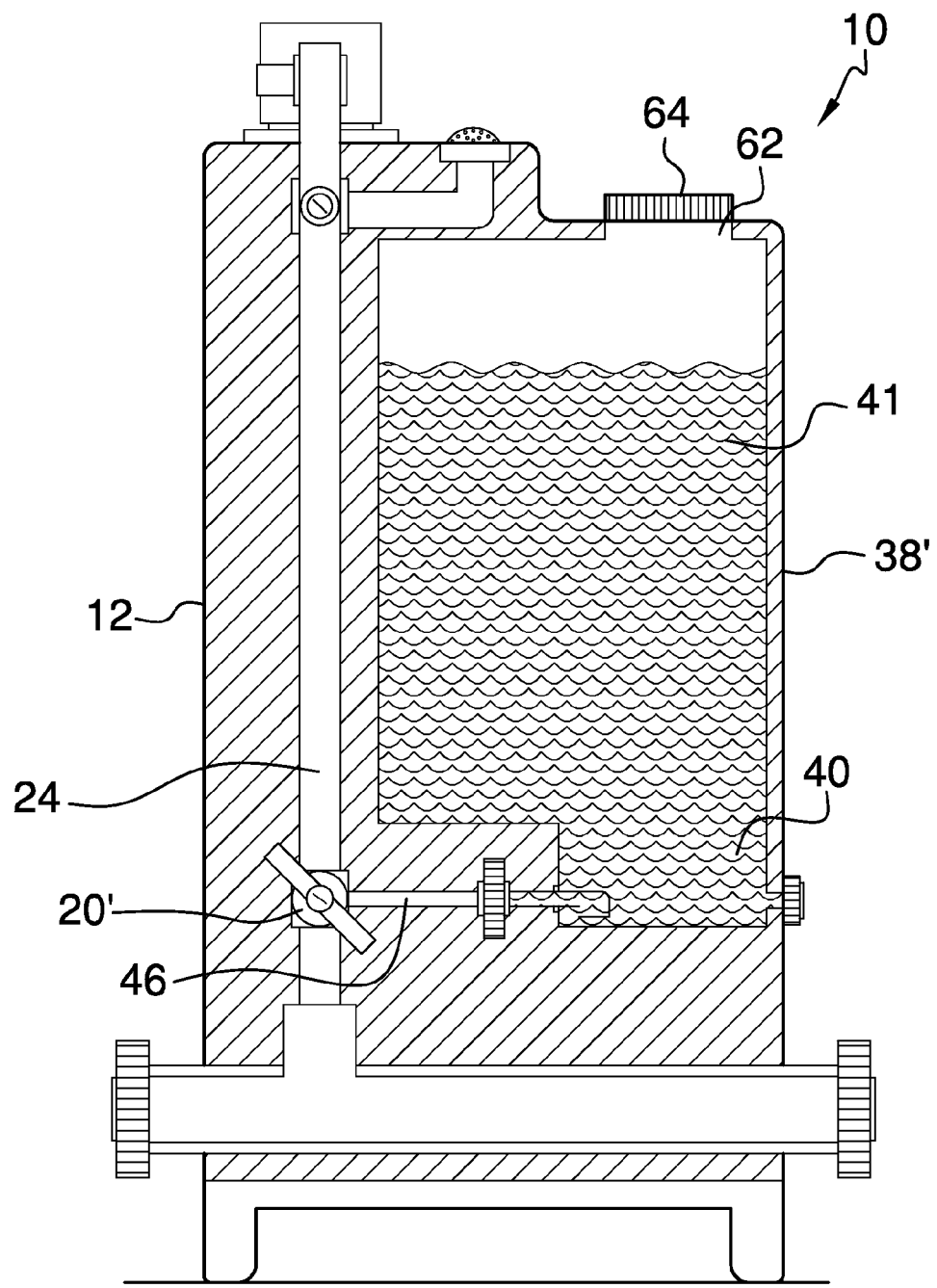
FIG. 9 is a diagrammatic illustration of an alternative construction of the dispenser of FIG. 8 where the by-pass passage is eliminated.

In FIG. 9, there is diagrammatically illustrated an alternative construction of the dispenser 10. Here, the dispenser 10 includes several alternative constructions previously described and shown. Particularly, the dispenser 10 is a combination of alternative constructions shown in FIG. 7 and FIG. 8. Same reference numbers are used for similar elements.

Figure 10:
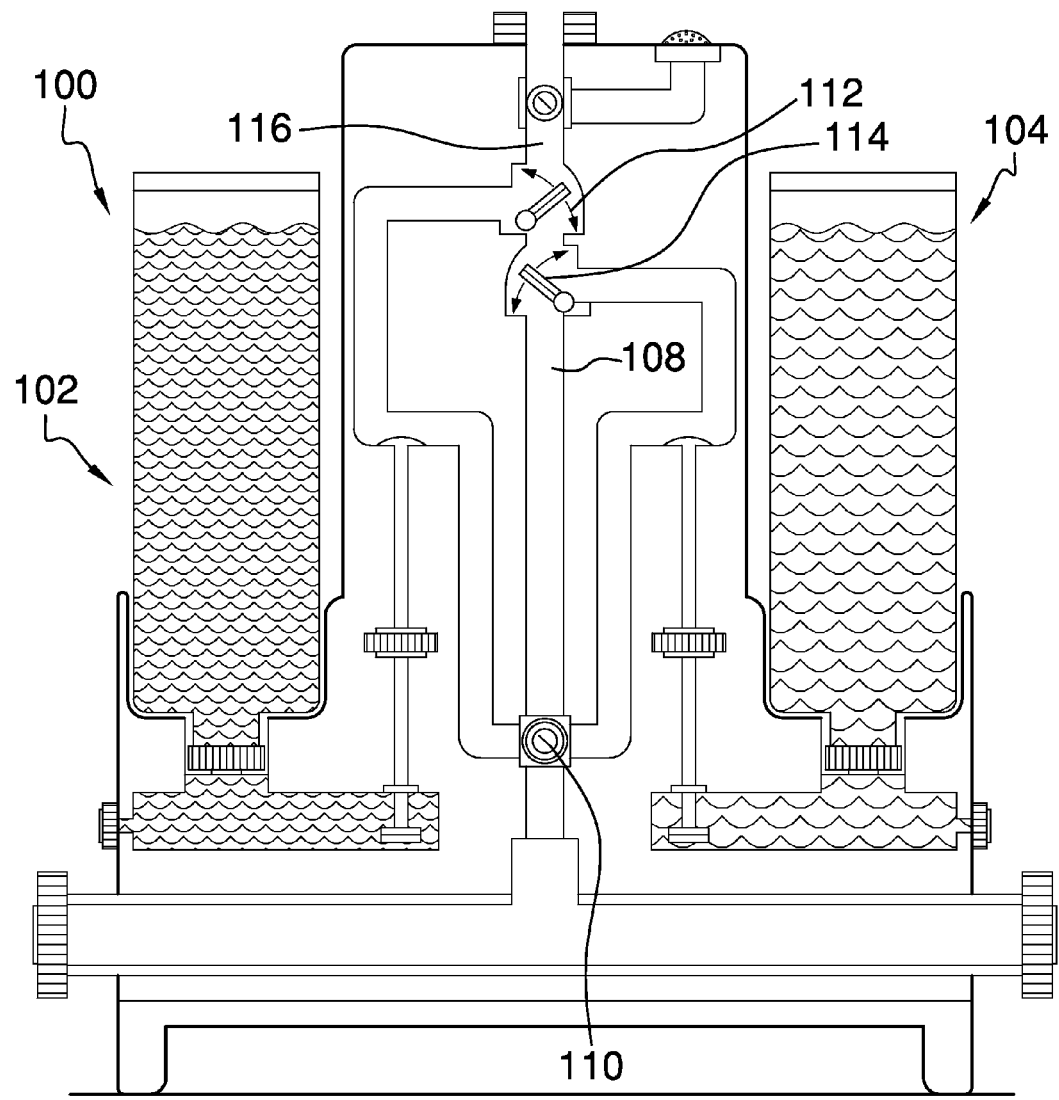
FIG. 10 is a diagrammatic illustration of another alternative construction of dispenser of FIG. 1.

In FIG. 10, there is diagrammatically illustrated yet another alternative construction of the dispenser 10. Here dispenser 100 comprises essentially any of the alternative constructions of dispenser 10 described herein, but in a dual construction wherein dispenser 100 includes two dispenser units 102 and 104 integrated into a single unit housing 106. Dispenser units 102 and 104 could be completely separated for independent and concurrent operation, or can be partially integrated together as illustrated for alternating use. Dispenser units 102 and 104 can take the form of any of the constructions of dispenser 10. However, as illustrated, dispenser units 102 and 104 are each of similar construction of dispenser 10 illustrated in FIGS. 1-6, with a few exceptions. Primarily the dispenser units 102 and 104 share a common bypass passage 108, and the three-way valve 20 is replaced by a four-way valve 110. Additionally, two flapper valves 112 and 114 are placed across discharge passage 116. It is believed the above description with regard to the construction and operation of the dispenser 10 is sufficient to understand the construction and operation of dispenser 100 here.

Figure 11:
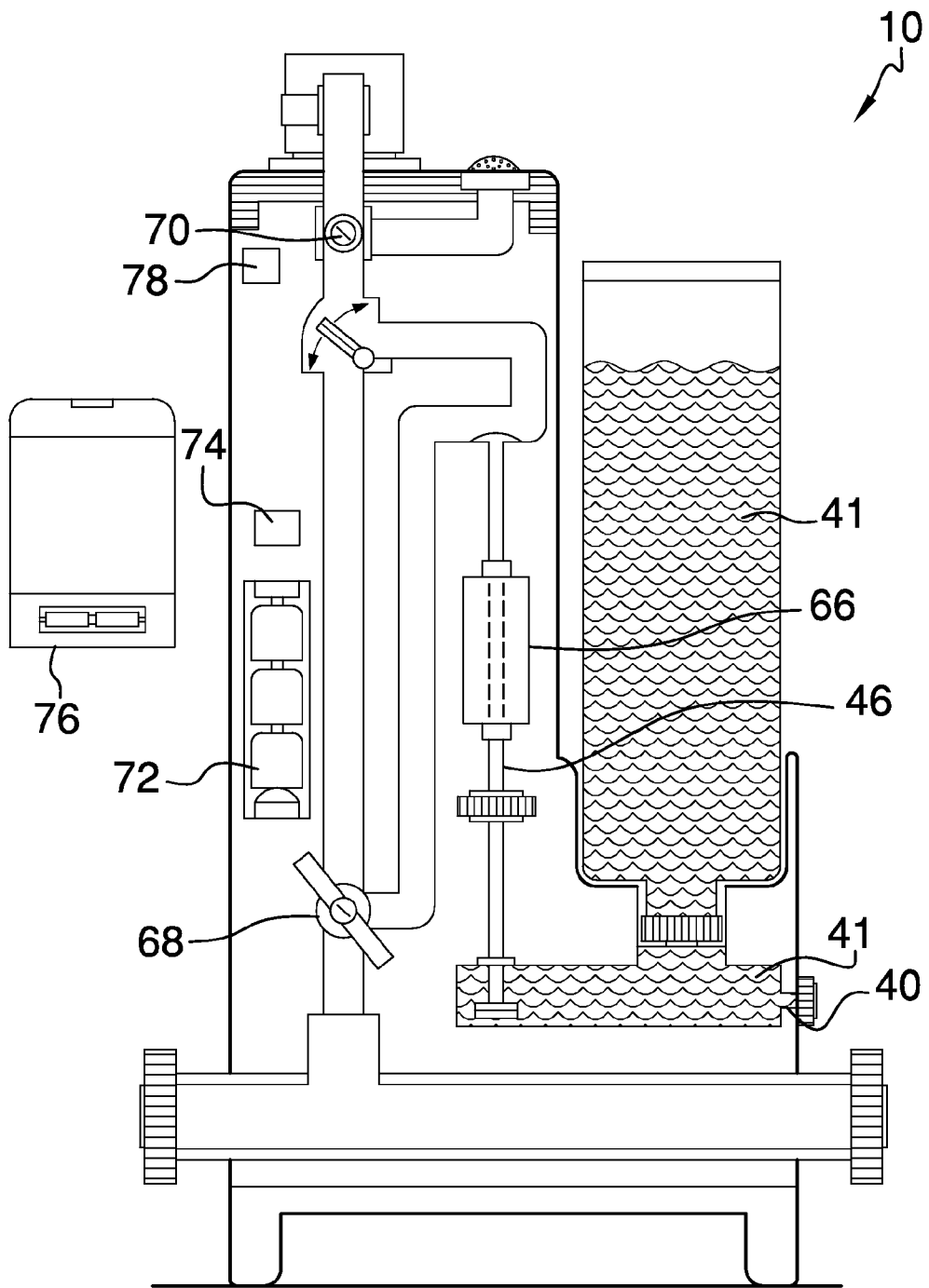
FIG. 11 is a diagrammatic illustration of yet another alternative construction of the dispenser of FIG. 1.

In FIG. 11, there is diagrammatical illustrated yet another alternative construction of dispenser 10. Here, the dispenser is primarily the dispenser of FIGS. 1-6, further including an electric pumping device 66 placed across tube 46. The electric pumping device 66 operates to pump concentrate solution 41 from the accumulator 40 and into the flow of water through passage 24. Valve 20 is replaced with an electrically operable valve 68, and valve 32 is replaced with an electrically operable valve 70. Both valves 68 and 70 may also be manually operated.

Still referring to FIG. 11, a power source, such as batteries 72 provide electrical power to the pumping device 66, valves 68 and 70, and various other components. A controller 74 is operatively connected to the pumping device 66, valves 68 and 70, and is programmed to control the operation of the pumping device and the valves in accordance with desired modes of operation. Alternatively or in addition solar panels, or a source of external power can be used to power the dispenser. Further, a remote control 76 can be provided to permit a user the ability to control the operation of the dispenser remotely. A receiver 78 operates to receive command signals from the remote control and transmit them to the controller 74.

Figure 12:
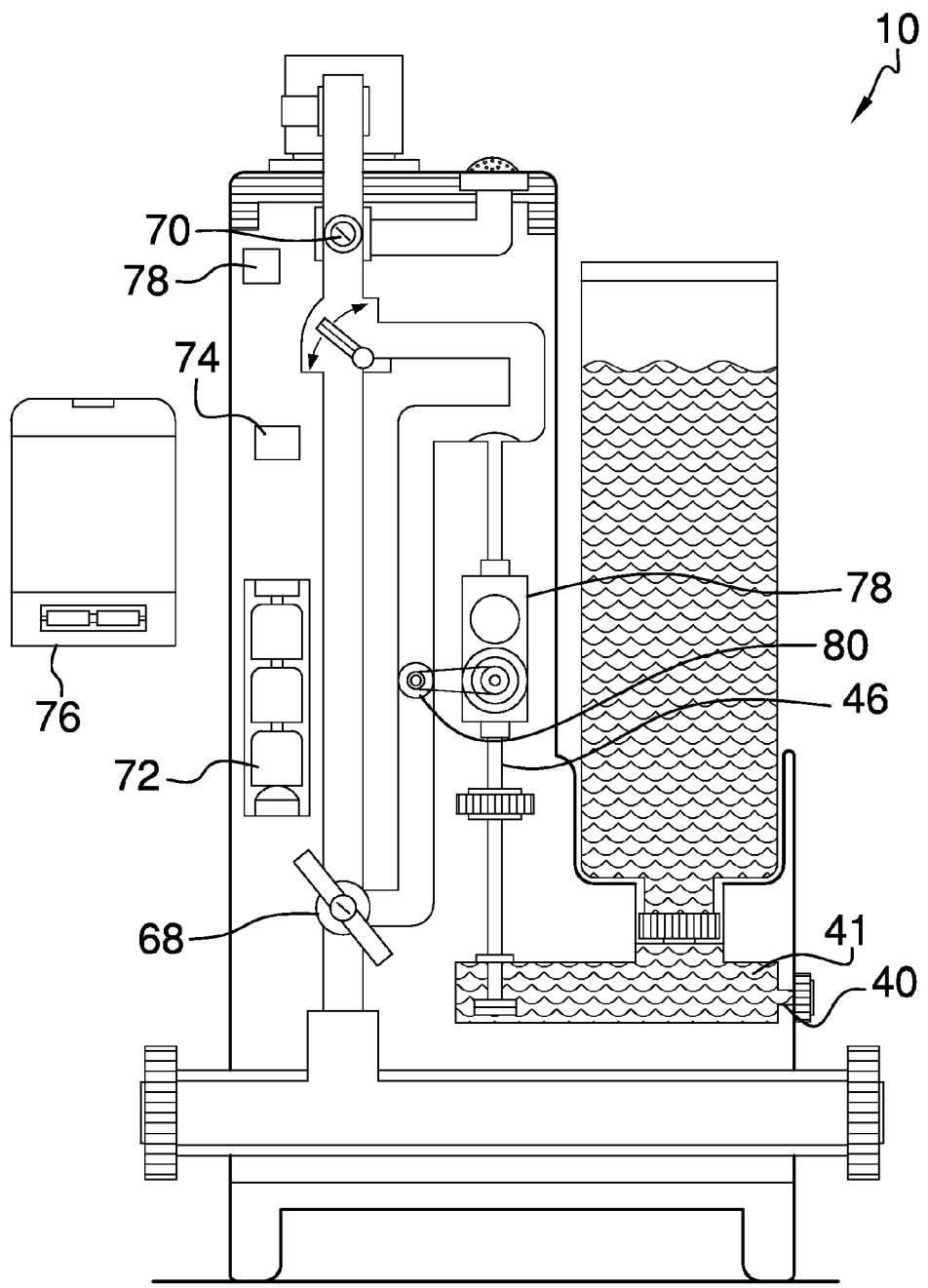
FIG. 12 is a diagrammatic illustration of an alternative construction of the dispenser of FIG. 11.

In FIG. 12, there is diagrammatical illustrated alternative construction of dispenser 10 of FIG. 11. Here the electric pumping device 66 is replaced with a hydro-mechanical pumping device 78. Pumping device 78 is operatively connected and driven by an impeller or turbine 80 placed across passage 24 that is operated as water flows therethrough. Pumping device 78 and turbine 80 may be operatively connected by a pulley and belt system as shown. However, alternative structures can be implemented to operatively couple the turbine 80 and pumping device 78.

Figure 13:
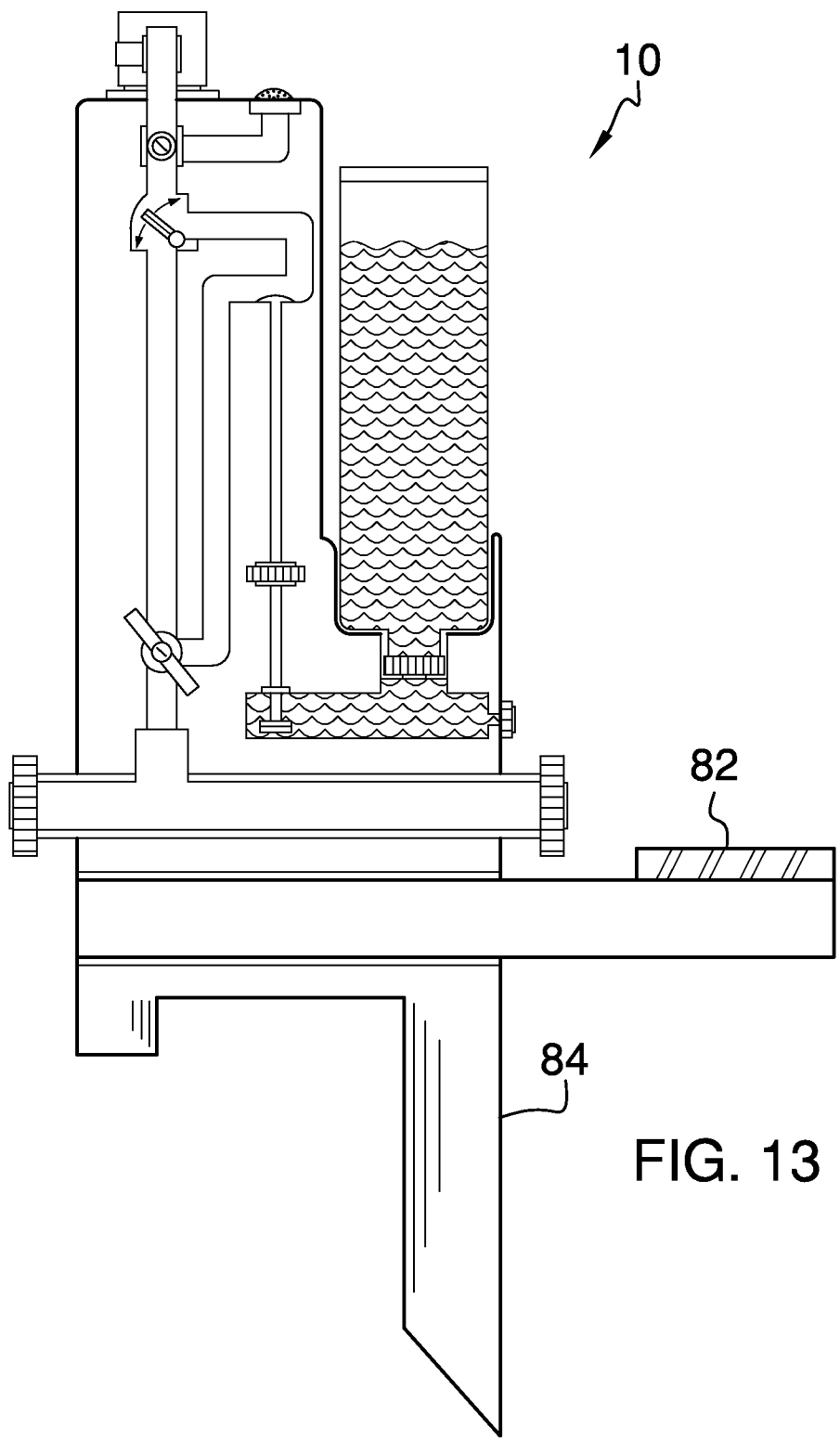
FIG. 13 is a diagrammatic illustration of another alternative construction of the dispenser of FIG. 1.

In FIG. 13, there is diagrammatically illustrated an alternative construction of the dispenser 10. Here, the dispenser 10 includes a foot step 82 and a ground spike 84 for securing the dispenser 10 to a soft ground surface by inserting the ground spike into the ground. A user can step on the foot step 82 to aid in inserting the ground spike 84 into the ground.

Figure 14:
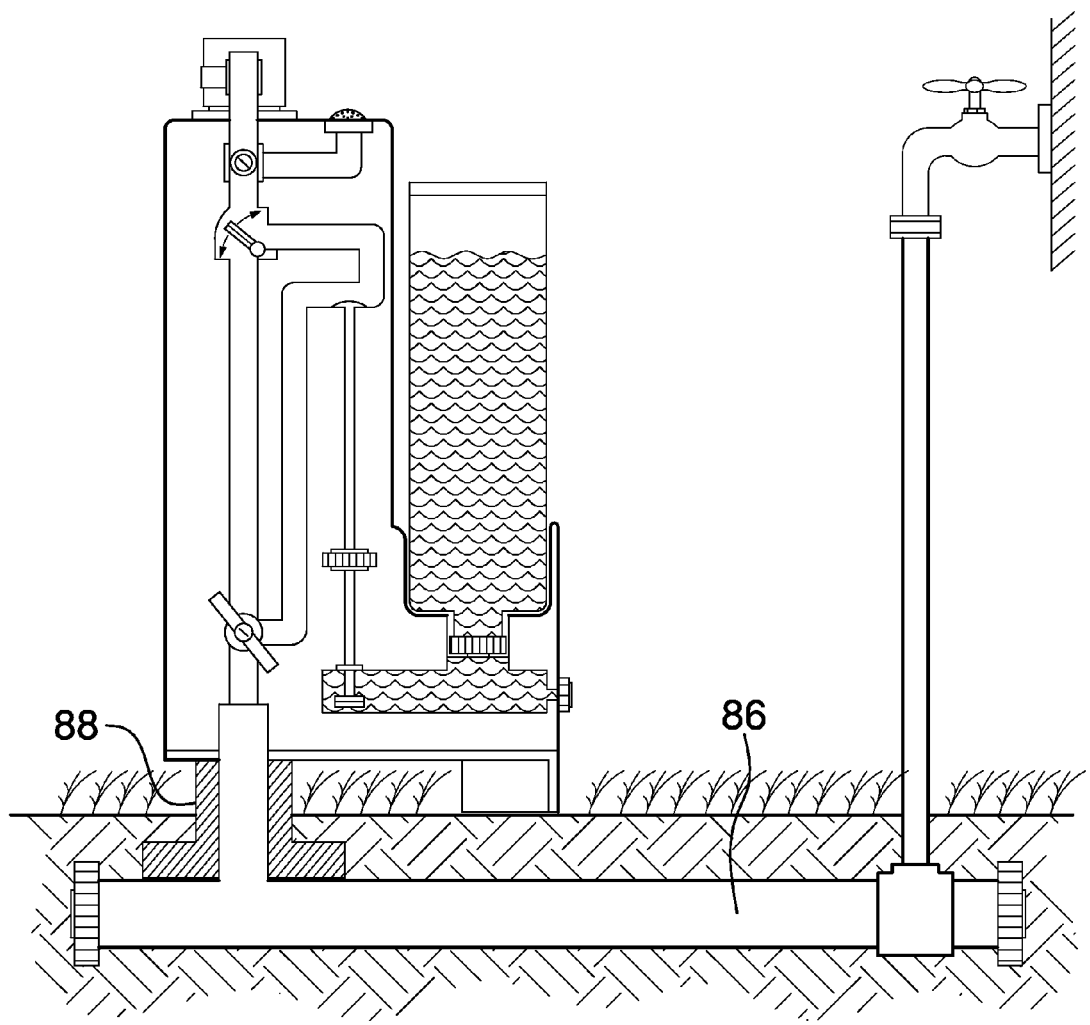
FIG. 14 is a diagrammatic illustration of another alternative construction of the dispenser of FIG. 1.

In FIG. 14, there is diagrammatically illustrated an alternative construction of the dispenser 10. Here, the dispenser 10 is configured to be hard plumbed with a water sprinkler system supply conduit 86. Supply conduit 86 replaces the main fluid passage 14. The dispenser 10 is further fitted with a pipe coupling 88 to permit coupling of the supply conduit 166 to the dispenser 10.

A number of embodiments of the present invention have been described. Nevertheless, it will be understood that various modifications may be made without departing from the spirit and scope of the invention.

What is claimed is:

1. A chemical dispensing apparatus for use in delivery of a treatment solution to a lawn, the apparatus comprising:
a main fluid supply passage configured for connection to a pipe system carrying water under pressure;
a housing including first and second discharge ports;
a fluid discharge passage;
a discharge control valve connecting said fluid discharge passage to said first discharge port and said second discharge port, said discharge control valve operates to selectively permit a flow of fluid or preclude the flow of fluid from said fluid discharge passage to either said first discharge port or said second discharge port;
an internal fluid supply passage connecting said main fluid supply and said fluid discharge passage;
a supply control valve connecting said internal fluid supply passage and said main fluid supply passage, said supply control valve operates to selectively permit the flow of fluid or preclude the flow of fluid from said main supply passage to said internal fluid supply passage;
a liquid chemical dispenser configured to dispense a chemical into the flow of fluid through said internal fluid supply passage;
wherein said main fluid supply passage, said fluid discharge passage, and said internal fluid supply passage are contained by said housing;
wherein said discharge control valve, said supply control valve, and said liquid chemical dispenser are supported and carried by said housing;
a bypass passage connecting said main fluid supply passage to said fluid discharge passage;
a flap valve operable to connect said fluid discharge passage and said internal fluid supply passage and to seal said bypass passage from said discharge passage when a fluid flows through said internal fluid supply passage or to connect said bypass passage to said fluid discharge passage and to seal said internal fluid supply passage from said bypass passage when the fluid flows through said bypass passage; and
wherein said supply control valve further connects said bypass passage and said main fluid supply passage, and further operates to selectively permit the flow of fluid or preclude the flow of fluid from said main supply passage to either of said internal fluid supply passage and said bypass passage.

2. The apparatus of claim 1, wherein said liquid chemical dispenser includes:
an accumulator for containing a liquid chemical; and a siphon tube connecting said accumulator and said internal fluid supply passage such that a flow of fluid through said internal fluid supply passage results in a quantity of liquid chemical contained in said accumulator being drawn through said siphon tube and into the flow of fluid through said internal fluid supply passage.

3. The apparatus of claim 2, wherein said liquid chemical dispenser further includes:
a chemical container that is fluidically connected to said accumulator providing a quantity of liquid chemical to said accumulator.

4. The apparatus of claim 3, wherein said liquid chemical dispenser further includes:
a cradle defined by said housing, said cradle configured to removably receive and retain said chemical container.

5. The apparatus of claim 3, wherein said chemical container is defined by said housing.

6. The apparatus of claim 1, further comprising:
a sprinkler head connected to said first discharge port; and
a misting head connected to said second discharge port.

7. The apparatus of claim 1, wherein said liquid chemical dispenser includes:
an accumulator for containing a liquid chemical; and
a lift tube connecting said accumulator and said internal fluid supply passage such that the flow of fluid through said internal fluid supply passage results in a quantity of liquid chemical contained in said accumulator being drawn through said lift tube and into the flow of fluid through said internal fluid supply passage.

8. The apparatus of claim 7, wherein said liquid chemical dispenser further includes:
a chemical container that is fluidically connected to said accumulator providing the quantity of liquid chemical to said accumulator.

9. The apparatus of claim 8, wherein said liquid chemical dispenser further includes:
a cradle defined by said housing, said cradle configured to removably receive and retain said chemical container.

10. The apparatus of claim 8, wherein said chemical container is defined by said housing.

11. The apparatus of claim 1, further comprising:
a sprinkler head connected to said first discharge port; and
a misting head connected to said second discharge port.

12. The apparatus of claim 1, further comprising:
a fluid pump disposed across said lift tube and operating to pump a quantity of liquid chemical from said accumulator and into said internal fluid supply passage.

13. The apparatus of claim 12, wherein said pump is an electrically operated pump.

14. The apparatus of claim 13, further comprising:
an electric power source carried by said housing; and wherein
said supply control valve is an electrically operable valve, said discharge control valve is an electrically operable valve, said electric pump, said supply control valve and said discharge control valve.

15. The apparatus of claim 14, further comprising:
a wireless remote control configured to operate said electric pump, said supply control valve and said discharge control valve.

16. The apparatus of claim 12, further comprising:
a water turbine disposed across said internal fluid supply passage, said water turbine operably connected to said pump and operating to drive said pump as fluid flows through said internal fluid supply passage and across said water turbine.

17. The apparatus of claim 16, further comprising:
an electric power source carried by said housing; and wherein
said supply control valve is an electrically operable valve and said discharge control valve is an electrically operable valve, said electric power source providing power for said supply control valve and said discharge control valve.

18. The apparatus of claim 16, further comprising:
a wireless remote control configured to operate said electric pump, said supply control valve and said discharge control valve.

* * * * *